Figure 1:
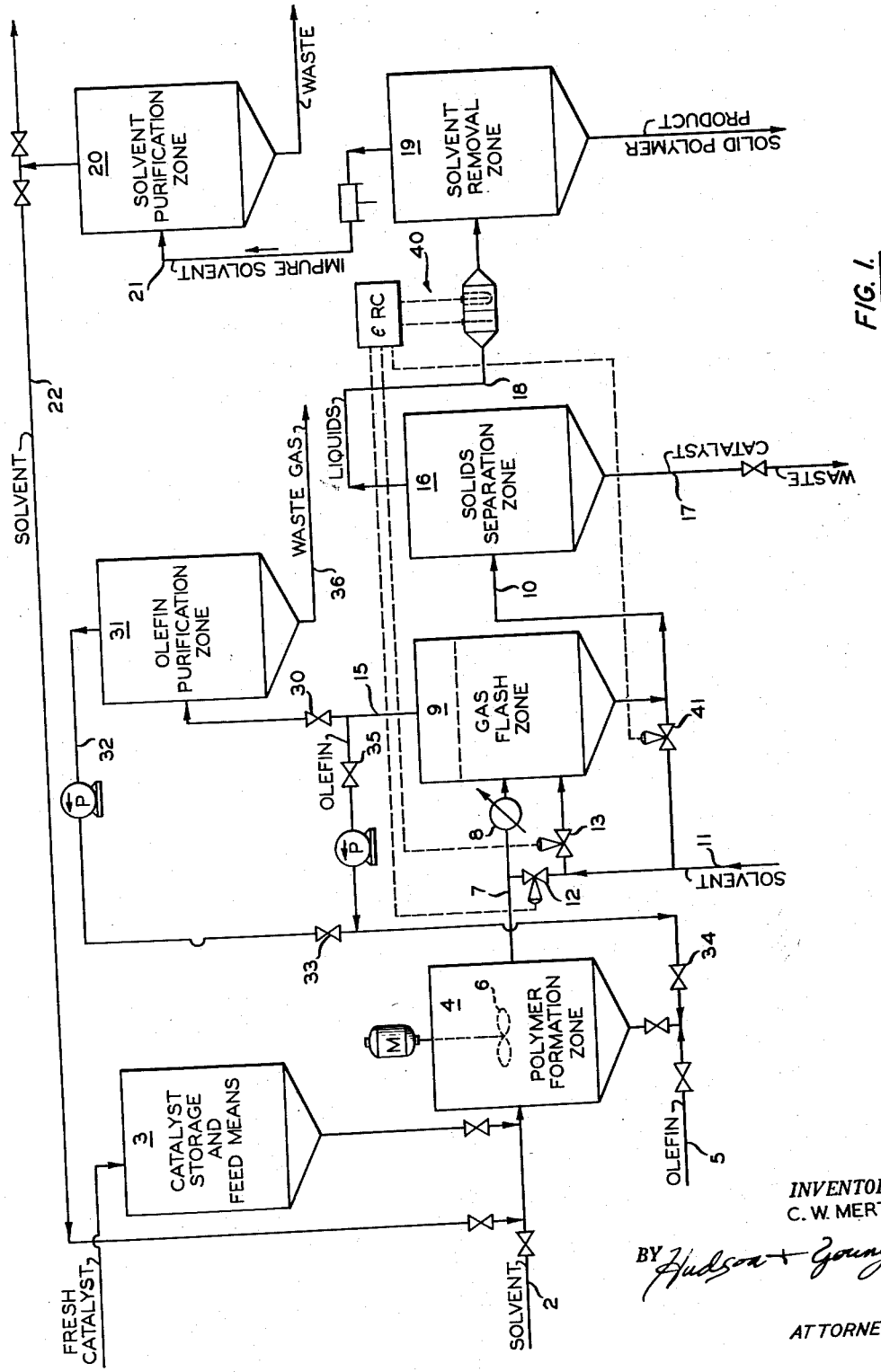

INVENTOR.
C. W. MERTZ
BY Hudson + Young
ATTORNEYS

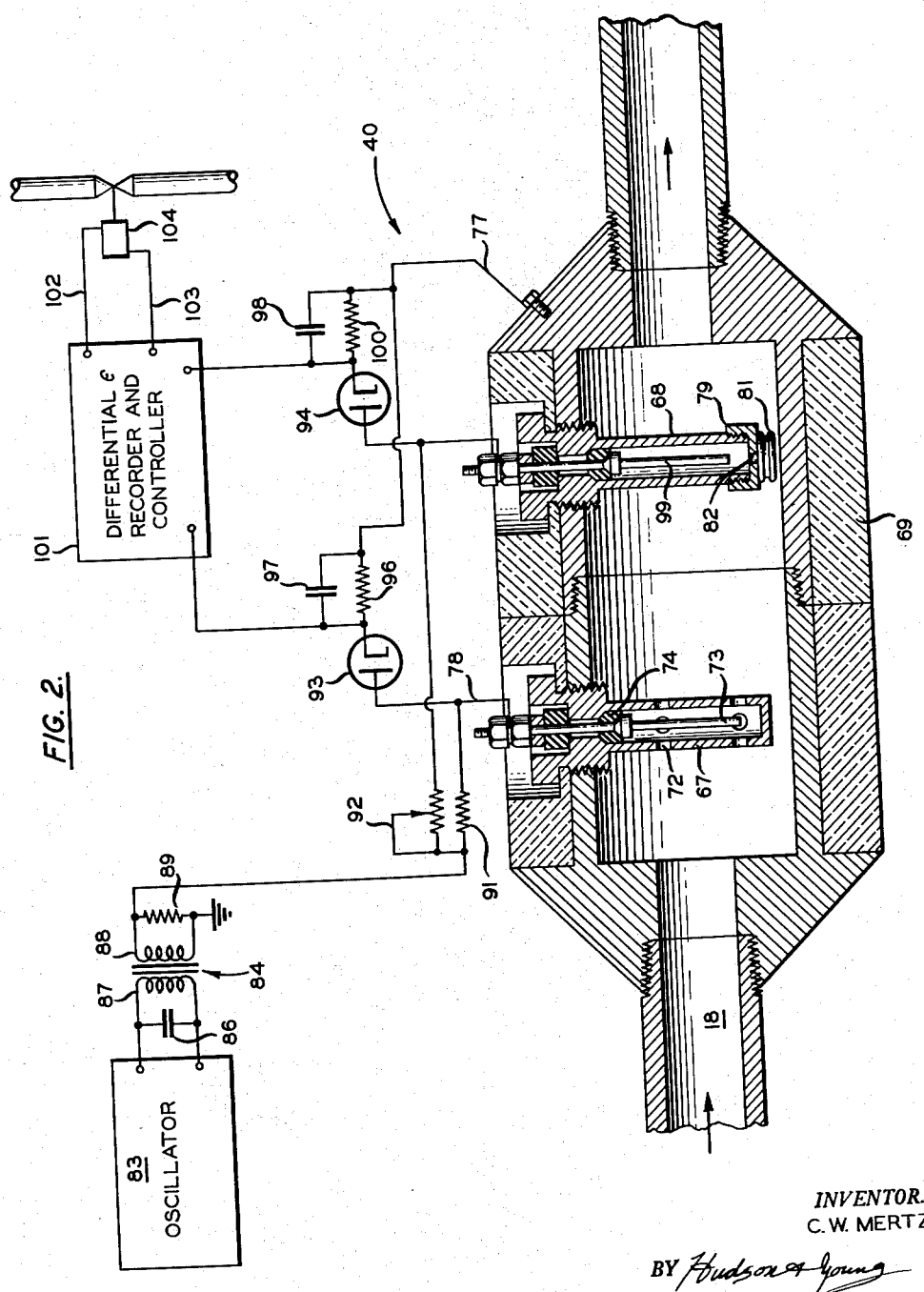

United States Patent Office 3,116,242
Patented Dec. 31, 1963

3,116,242
AUTOMATIC CONTROL OF FLUID BLENDING
Clyde W. Mertz, Bartlesville, Okla., assignor to Phillips Petroleum Company, a corporation of Delaware
Filed Mar. 30, 1959, Ser. No. 802,967
4 Claims. (Cl. 210—70)

This invention relates to an automatic control process for fluid blending and in one specific embodiment it relates to a process for automatically controlling a filtering procedure wherein a diluent is added to the feed stream to the filters in order to maintain the liquid portion of such feed in a filterable condition by flowing the filtrate between the plates of a capacitor while an alternating current is being applied to the capacitor plates to thereby produce a signal and controlling the diluent addition responsive to such signal.

The instant invention is a continuation-in-part of my copending application Serial No. 555,648, filed December 27, 1955, now Patent Number 2,931,433 entitled Evaporation Process Control by Variation in Process Material Dielectric Constant.

The process of this invention is particularly applicable to the filtering step in the recovery of a polymer produced in a process of the type disclosed and claimed in the U.S. patent to Hogan and Banks, No. 2,825,721 which is a continuation-in-part of their abandoned application, Serial No. 476,306, filed December 20, 1954, wherein an aliphatic 1-olefin having a maximum chain length of 8 carbon atoms and no branching nearer the double bond than the 4-position is subjected to polymerization conditions in the presence of a solid catalyst comprising chromium oxide, of which a substantial portion of the chromium is hexavalent, associated with at least one oxide selected from the group consisting of silica, alumina, zirconia and thoria. The chromium (Cr) content of the catalyst is ordinarily a minor proportion, preferably from 0.1 to 10 weight percent. Polymerization is ordinarily conducted at a temperature in the range 150 to 450° F.

The reacted olefin, e.g., ethylene and/or propylene, is often, though not necessarily, subjected to the polymerization conditions in admixture with a hydrocarbon solvent which is inert and can exist as a liquid at the polymerization temperature. Suitable solvents of this class are normally liquid naphthenes, such as cyclopentane, cyclohexane, methylcyclopentane, methylcyclohexane, and paraffinic hydrocarbons both normal and isoparaffinic having from 3 to 12, preferably 5 to 12, carbon atoms per molecule, e.g., normal hexane, isoheptanes, normal octane and isooctane (2,2,4-trimethylpentane). This obviously includes mixtures of these materials, as such mixtures still have a boiling point range spaced from the boiling point of the polymer, and a joint dielectric constant and individual dielectric constants all spaced from the dielectric constant of the polymer by a suitable amount.

The reaction can be conducted as a fixed-bed reaction but is, in many cases, conducted with the catalyst in comminuted form in suspension, as a slurry, in the hydrocarbon solvent. The effluent withdrawn from the reactor comprises a solution of polymer in the solvent, and when a catalyst slurry or suspended catalyst is used, the effluent comprises a solution of the polymer in the solvent, suspended catalyst with undissolved polymer adhering thereto, and, in many cases, small amounts of unreacted olefin. The unreacted olefin can be removed by venting and/or flashing and the remaining mixture is ordinarily heated to a suitable temperature to effect substantially complete solution of the polymer in the solvent.

The next step is to prepare the solution for filtering to remove entrained catalyst. Additional solvent can be added at this point, if desired, and it is ordinarily the practice to adjust the concentration of polymer in the solution to a value in the range of approximately 2 to approximately 10 weight percent. The solution is then filtered to remove the suspended catalyst and a solution (filtrate) containing from 2 to 10 weight percent of polymer in the solvent is thus obtained from which the polymer is recovered. The method of this invention is particularly applicable to the removal of solid catalyst from such a solution by filtering, and particularly by automatic control of such filtering by measuring the dielectric constant of the filtrate and controlling the solvent addition to maintain the polymer concentration in the 2–10 weight percent range, and preferably in the 3–3.5 weight percent range.

Polymers ultimately recovered are useful for fabrication into pipe, tubing, electrical insulation, and water resistant wrappings, as more fully set forth in the cited patent. Polymer recovery may be effected by vaporizing the solvent, preferably in stages. According to one procedure approximately 25 to 75 percent of the solvent is vaporized in the first stage, and most or substantially all of the remaining solvent is vaporized in the final stage, or stages. For example, when the invention is applied to a solution of polyethylene in a solvent of 2,2,4-trimethylpentane or cyclohexane, drawn as a filtrate from the filters as previously indicated, it is preferred that the solution (filtrate) fed to the first step of the process have a polyethylene concentration in the range 2 to 10 weight percent, but in commercial operations it generally runs from 3 to 3.5 percent and hardly ever over 5 percent. The first step concentrates this solution to a preselected polyethylene concentration of a single percentage lying in the range 8 to 15 weight percent, it being preferred at present to select 10 percent concentration. The final stage, or stages, may decrease the solvent concentration to less than 1 weight percent in the product polymer.

As stated in the first paragraph of this disclosure, a signal to be used in control is obtained by flowing a solution, e.g. the above filtrate, between the plates of a capacitor while impressing an alternating current signal on said plates. These plates are part of an electrical circuit, e.g. a bridge. The dielectric constant of the solution changes with the concentration therein of, for example, an olefin in the above-mentioned filtrate and changes in this dielectric constant produce commensurate changes in the capacitance of the electrical circuit thereby to produce a signal representative of the solution concentration. This procedure I shall term, for the sake of brevity in the remaining disclosure, "measuring the dielectric constant." These changes in electrical characteristics are sensed by appropriate means and converted into a control signal which is in turn employed to adjust a valve or other means in a manner suitable for maintaining the concentration at a predetermined level.

Specifically, the instant process is practiced by measuring the dielectric constant of a filtrate, converting or translating such measurement into a control signal, transmitting the control signal to a means for adjusting the flow of one of the fluids to be blended into the feed stream going into the filter (e.g. solvent), and adjusting said means to maintain by a suitable amount, thus to maintain the filterability of the filter feed at a predetermined level. In a specific embodiment as practiced with relation to adding a solvent in the above described process, the dielectric constant is measured at a point downstream of the filter due to the otherwise interference with the measurements by solids and other inhomogeneities which upset the accuracy of the instrument, and this measurement, after conversion and transmission, is employed to control the addition of solvent to the stream going to the filters to thereby form a filter feed solution. The solvent addition is controlled to maintain the concentration of the solvent between approximately ninety and ninetyeight weight percent in the filtrate that is withdrawn from the filters.

It is an object of this invention to provide an improved process for the automatic control of fluid blending. It is an object to provide improvements in a process of adding a diluent upstream of a filtering process. It is another object to provide improvements in process of filtering dilute solution of a polymer and a solvent, wherein the polymer has been formed from an olefin being subjected to polymerization conditions in the presence of a catalyst comprising chromium oxide of which a substantial portion of the chromium is hexavalent, and associated with at least 1 oxide selected from the group consisting of silica, alumina, zirconia, and thoria. Other objects and advantages and features will become apparent from the following disclosure.

In the drawings:

FIGURE 1 shows schematically a flow sheet wherein the instant process may be practiced; and FIGURE 2 illustrates an apparatus suitable for practicing the instant process.

As stated above, the instant invention is practiced by measuring the dielectric constant of a stream and employing the measurement thus obtained to adjust the flow of a fluid into a fluid blending process. More particularly, the invention is aimed at a process of employing dielectric constant means to adjust the feed of solvent into a filter feed stream at a point upstream of the filters. The dielectric is measured at a point downstream of the filters.

In the system shown in FIGURE 1, solvent enters through inlet conduit 2 and is mixed with catalyst supplied from storage zone 3. The catalyst can be, for example, chromium oxide supported on a silica-alumina gel and prepared as described in said Hogan et al. application or by impregnating a steam-aged, coprecipitated gel composite comprising 90 weight percent silica and 10 weight percent alumina with an aqueous solution of chromium trioxide, drying the resulting solid composite, and heating the dried composite at approximately 950° F. for about 5 hours in a stream of substantially anhydrous air. The catalyst contains a total of 2 weight percent chromium, at least half of which is in the hexavalent state. The catalyst particle size is sufficiently small to facilitate the formation of a slurry of catalyst in the solvent. A suitable range of particle size is from 20 to 100 mesh. The catalyst-solvent slurry passes into the polymer formation zone 4. Ethylene enters the system through inlet 5 and passes into the reaction zone 4 wherein it is mixed with the catalyst and the solvent at a temperature, for example, of approximately 275° F. The solvent can be 2,2,4-trimethylpentane. The proportions of solvent and ethylene are so adjusted that the concentration of polymer in the reaction mixture does not exceed approximately 15 weight percent and preferably is in the range from 5 to 10 weight percent. The pressure in reaction zone 4 is sufficient to maintain the solvent substantially in the liquid phase and can be, for example, 500 p.s.i.

The reaction mixture is maintained in a state of turbulence so that the catalyst is maintained in a substantially uniform suspension or slurry in the reaction mixture. This turbulence can be obtained by jet action of incoming ethylene through inlet 5 and/or by the use of a mechanical stirrer indicated by the numeral 6 and driven by a suitable motor M. The reaction zone effluent which comprises a mixture of polymer, solvent, and suspended catalyst, together with small amounts of unreacted and/or inert gas, is passed through conduit 7 and heater 8 to flash zone 9. Additional solvent can be added through conduit 11, by flowing into conduit 7 through valve 12 or by flowing directly into the flash zone through valve 13, in order to adjust the concentration to a suitably low value of 2 to 10 weight percent, previously stated, so that the viscosity is not too high for easy evolution of gases (monomer) from solution. In flash zone 9 the mixture is maintained in a turbulent state, as by the mechanical stirrer 6 driven by motor M in the polymer formation zone 4. The temperature is maintained, for example, by the use of a heater at from 300 to 325° F., i.e., somewhat higher than that utilized in reaction zone 4. The pressure is sufficient to maintain the solvent substantially in the liquid phase, but is preferably lower than that in reaction zone 4 to facilitate the evolution of dissolved gas, including unreacted ethylene, which is vented through outlet 15. The heater may be of any suitable design known in the art; for example, it can be a steam jacket around zone 9, or a steam coil therein, or an electric jacket around zone 9, or an immersion heater, or any liquid chemical heater of the prior art. The vent gases are recycled to the reaction zone through means hereinafter described.

Effluent from flash zone 9 passes through conduit 10 to solids separation zone 16. The material passed through conduit 10 is a homogeneous solution of substantially all of the polymer in the isooctane solvent, which solution contains suspended solid catalyst. Solids removal zone 16 comprises any suitable equipment or combination thereof known in the art for the removal of suspended solids from liquids. For example, it can be a filter or a centrifuge. It should be suitable for operation under pressure in order to maintain the solvent in the liquid phase during the filtration. Catalyst removed by the filtration is withdrawn from the system through conduit 17. The withdrawn catalyst can be regenerated or reactivated, if desired, and recycled to catalyst storage zone 3 by means not shown in the drawing.

The solution which has been freed of suspended solids is passed through conduit 18 to a solvent removal zone 19 which is ordinarily in the form of a series of like-constructed flash evaporation tanks the first of which is operated, for example, at a temperature of 290° F. and a pressure of 33 p.s.i.g. maintained by any conventional means such as constant pressure valve disposed in the conduit 18, the solvent effluent conduit 21, or in the upper region of zone 19. Approximately half of the solvent is evaporated in the first tank of zone 19, and the evaporated solvent is passed through conduit 21 to recovery, as by condensation and purification, in the zone 20. Evaporation in subsequent stages within the zone 19 may require compressing the solvent effluent prior to directing it into purification zone 20. The condensed solvent is then recycled through conduits 22 and 2. The residue thus formed in the downstream stages of zone 19 is treated to recover the polymer by vaporizing from 85 to 99 percent of the solvent remaining in said solution at a temperature below the melting point of said polymer and thus obtaining a solid residue consisting essentially of said polymer and containing solvent, subjecting said solid residue to kneading at a temperature above its melting point while vaporizing most of the remaining solvent therefrom, solidifying the polymer so obtained, and recovering solid, substantially purified polymer.

The flash gases passing out of the flash zone 9 through the vent line 15 are mostly the monomer, i.e., the olefin as found in the feed. These olefins can be recycled to the process through two alternate routes. One route involves opening the valve 30, flowing the vent gases into the olefin purification zone 31, and removing the olefin from the purification zone via conduit 32 through valves 33 and 34. The alternate route is through the valve 35 and valve 34 back to the polymer formation zone 4. Appropriate pumps or compressors, as the case may be, are disposed in the respective recycle routes. Waste gases and other products are removed from the purification zone through the conduit 36.

As mentioned above, the process of the instant invention is practiced by measuring the dielectric constant of a stream and employing such measurement to adjust a fluid blending operation, and more specifically, to use such measurement to adjust the flow of solvent into a filter feed stream. Apparatus for practicing this procedure is shown broadly as the assembly 40 in FIGURE 1. The details of this assembly are described hereinafter with respect to FIGURE 2. FIGURE 1 shows the assembly 40 to be disposed downstream of the solid separation (filter) zone 16, at which point it can receive a solids-free stream and where it flows between the plates of a capacitor while an alternating electrical current is applied to the capacitor, as explained with respect to FIGURE 2, of the filtrate and converts this dielectric constant into a control signal. The control signal may be either a pneumatic, hydraulic, or electric signal and is transmitted through an appropriate means (e.g., electrical or pneumatic signal-conducting means) to where it is then preferably applied to one of the solvent flow control valves 12, 13 and 41. The signal may also be transmitted to any one of, or combination of, the valves 12, 13 or 41. It is preferred that the valve 41 be the one to which the signal is transmitted. Valve 41 offers the advantage of reducing the time lag in the process response to valve adjustment, inasmuch as the other alternatives require that the fluid (solvent and reactor effluent) reside in the flash zone 9 for some length of time. The details of the assembly 40 are set forth in FIGURE 2. A description of FIGURE 2 now follows:

Assembly 40 includes a pick-up, or probe unit, 67 which is an electrical condenser having two plates, the first being the outer tube to which numeral 67 is applied having a plurality of openings 72 therein to allow it free passage of liquid, e.g., filtrate, therethrough, the second plate being rod 73 which is centrally located in tube 67 and insulated therefrom by suitable electrical insulation means 74, such as silicone rubber, a synthetic material the molecules of which are long chains of silicon-oxygen units with two methyl radicals attached to each silicon atom. Silicone rubber is noted for its retention of its elasticity at temperature as high as 570° F., and it is not affected by the liquids involved in the process as described above, or the temperature of about 300° F. at this point of said process.

Another suitable material is "Teflon," which is the registered trademark name of a plastic consisting essentially of a tetrafluorethylene polymer. "Teflon" resists the attack of all materials, except molten alkali metals, and can be employed over a temperature range of $-100°$ F. to 450° F. Other suitable materials can be chosen depending on the liquids which are going to contact the same and the temperature involved.

Probe unit 67 is screwed into the pipe 18 which acts as a ground to the outer plate 67 through ground wire 77, and inner plate 73 is connected to lead 78.

In circuit with 67 is a reference probe such as the electrical condenser 68, of like construction as 67 except that holes 72 are omitted and a removable cap 79 is provided, having an expandable bellows section 81 in communication with the interior of 68 through a central perforation 82 in cap 79. This enables condenser 68 to be filled with a standard or comparison liquid, preferably a sample of the desired concentration of the same polymer in the same solvent as it is desired to produce as the effluent of the filter zone 16. This sample is sealed inside of 68 by cap 79, and expansion and contraction of the same because of temperature changes is provided for by flexible metal bellows 81.

The capacitance of probe 67 is compared directly with the capacitance of reference probe 68, which is described above is filled with a material similar to that under analysis or is filled with a material whose response to temperature change is like that of the filtrate. In this circuit it is preferred to use an oscillator 83 producing an alternating current of about one kilocycle which is fed into the circuit of 40 through a transformer generally designated as 84, preferably comprising a condenser 86, a primary coil 87 and a secondary coil 88 in parallel with a resistance 89. One end terminal of coil 88 is grounded and the other terminal is connected through suitable resistances 91 and 92 to the anodes of diodes 93 and 94, respectively. Preferably, the resistance 92 is adjustable. The cathodes of these diodes are grounded through resistances 96 and 100 which are shunted by capacitances 97 and 98, respectively, through wire 77 and pipe 18 back to the outer cases of condensers 67 and 68. Electrode 73 of probe 67 is connected by wire 78 to the anode of diode 93 and electrode 99 of probe 68 is similarly connected to the anode of diode 94. The cathode of diode 93 is connected to one input terminal of a recorder and controller instrument of conventional construction 101 and the cathode of diode 94 is similarly connected to the second input terminal of said controller 101.

The circuit therefore comprises an electrical bridge circuit in which the resistors 91 and 92 form two arms of a bridge and condensers 67 and 68 form the other two arms of the bridge. Any unbalance of this bridge is recorded by unit 101, such that a continuous record of any deviation in the capacitance of probe 67 from probe 68 is recorded. This arrangement is particularly useful because insulation 69 and the flowing liquid maintain probes 67 and 68 at the same temperature, thereby eliminating the effects of temperature variations from the below-given dielectric constant formula.

Recorder and controller 101 through the two electrical output leads 102 and 103 energizes the motor 104 as a function of the electrical input to unit 101, 104 being the motor of any one of motor valves 12, 13 or 41 which may be disposed in lines 11 shown in FIGURE 1, so that the rate of solvent addition is a function of the difference in dielectric constant of the liquid flowing through pipe 18, as measured by probe 67, and that of a standard liquid in probe 68 maintained at the same temperature.

Whenever the temperature of the filtrate is maintained constant, as is often done in practicing the process of FIGURE 1, it is unnecessary to have the reference probe 68, and the device operates with the output of probe 67 being the only input to the recorder and controller 101 (as seen in FIGURE 2) as will be obvious to those skilled in the art.

The apparatus shown in FIGURE 2 is a differential dielectric constant device. As practiced in the polymer production system of FIGURE 1, or any other system where two fluids are blended together, it requires that there be a substantial difference in the dielectric constants of the liquids being blended. The following two paragraphs give the details of the manner in which the dielectric constant measurement can be employed in a system such as that in FIGURE 1. It should be noted here that solids, entrained gas bubbles, and other inhomogeneities upset the accuracy of this type of instrument, therefore only fluids, and preferably liquids, which are of a homogeneous physical state, should be measured. The streams controlled, of course, do not have to be of such nature.

The formula for the variation of the dielectric constant of a material with temperature is $\epsilon_t' = \epsilon_t - a(t'-t)$. For example, cyclohexane has a dielectric constant at 68° F. (temperature $t$) and at 77° F. (temperature $t'$) of 2.015 and the temperature compensation factor $a$ is therefore 0.00088. Isooctane (2,2,4-trimethylpentane) has a dielectric constant, similar in value, of 1.94 at 68° F. (room temperature). The polyethylene polymer, produced under the above described conditions in the above described process, has a dielectric constant at 68° F. of 2.37. Therefore, at 300° F., a 10 percent change in concentration (by weight) of the polymer changes the dielectric constant of a solution of said polymer in cyclohexane, or isooctane, about 1.3 percent. In this general range, it has been found that the relationship of dielectric constant to percent concentration is a substantial straight line function, with percent polymer as the ordinate and the instrument reading as the abscissa. This proportional straight line function has sufficient slope so that a change of 0.1 weight percent polymer in the solution gives a sufficient change in instrument reading to actuate control instruments. At about 1 percent, the polymer concentration can be read to within 0.1 percent.

In actual operations for producing polymers of the nature herein described, it is desired to maintain the temperature of the polymer-solvent solution in the range extending from 150° F. to 450° F., and preferably at about 300° F.

It will be obvious to those skilled in the art of recording and control instruments, from the accompanying description of FIGURE 2, how to calibrate and adjust the instruments involved in order to obtain the best results, and maintain any desired pre-selected polymer concentration of the selected polymer in the selected solvent, there being tables of dielectric constants, such as National Bureau of Standards circular 514 issued August 10, 1951, giving such constants for the solvents, but not for the polyolefin polymer, and it being easy to run calibration tests on different concentrations of the selected polymer and solvent. For example, with one polyethylene normally solid polymer in solution in cyclohexane at 307° F. the calibration curve of percent by weight polyethylene $x$ to instrument reading $y$ was: $x=0.375$, $y=7.25$. When necessary during calibration, adjustable resistor 92 can be set to balance the circuit of FIGURE 2.

It should therefore be evident from the foregoing disclosure that I have invented improvements in a process for controlling fluid blending. Such improvements are especially applicable to those processes where the blending takes place by adding a solvent to a filter feed stream. The process steps comprise measuring the dielectric constant of a filtrate or of a stream after mixing various fluids to be blended, converting the measurement thus obtained into a control signal (which can be either electrical or pneumatic, according to the nature of the recorder controller 101 and the transducer apparatus employed therein) and transmitting the control signal by appropriate means to control one or the other of the streams being blended and in particular to control addition of a solvent to a filter feed stream. In the foregoing specification in the appended claims when I use the term "transmitted" or "transmitting" I refer to providing a signal from the recorder controller 101 to the motor valve 104 or to valves 12, 13 or 41. When I use the term "flow adjusting means" or "motor valve" I refer to an apparatus such as a globe valve, gate valve, diaphragm valve, plug valve, three way valve, or even to a device for pinching a flexible conduit (where flexible conduit is used). When I use a term "adjusting" I refer to manipulating such "adjusting means" in such a manner as to change the flow of one fluid into the process in order to maintain the concentration of one of the fluids at a constant level in such process, as by transmitting a signal to a motor 104 and making a suitable adjustment in the setting of the valve or flow adjusting means controlled thereby. For example, assume a concentration of 3 percent polymer is desired in the filtrate of the system of FIGURE 1. If the assembly 40 of FIGURE 1 produces a signal that is representative of 2½ percent of polymer in such filtrate then the flow adjusting means is adjusted to decrease the solvent flow by such an amount as to provide a 3 percent polymer concentration. Conversely, if the measuring step of assembly 40 produces a signal which represents more polymer in the filtrate than is desired then the solvent flow is increased by a corresponding amount.

It is not my intention to be limited in the practice of the process to the specific embodiments shown in the appended drawings and described in the specification. It is my intention to include as my invention all the equivalent process steps and apparatus for carrying them out which would be obvious to one skilled in the art.

I claim:

1. A process for controlling filtering of a mixture of a suspension of a solid in a liquid solution of a polymer in a solvent in a filtering system which comprises adding a solvent to a mixture of such solid, polymer, and solvent upstream of a solid filter zone so as thereby to maintain the liquid components of the mixture in a state such that they will pass through said solid filter system, said solvent addition being achieved by the steps of applying an alternating current to the plates of a capacitor while flowing at least a part of a filtered polymer-solvent solution between said plates at a point downstream of said filtering zone to produce a first signal, converting such first signal into a control signal, transmitting the control signal to a solvent flow-adjusting means, and adjusting the flow-adjusting means responsive to the control signal to increase solvent flow into a point upstream of said filtering zone in response to said applying while flowing step producing a first signal that is representative of less solvent in such solution than a predetermined amount or to decrease the solvent flow at such upstream point when such first signal is indicative of more solvent than a predetermined amount.

2. A process for controlling the filtering of a mixture of solution and catalyst which comprises forming a solution comprising (1) the polymeric form of an olefin that has been polymerized by contacting the olefin with a catalyst comprising chromium oxide and at least one material selected from the group consisting of silica, alumina, zirconia and thoria, at least a part of the chromium being in the hexavalent state, and (2) a solvent for the polymer, and wherein at least a part of the solvent is added to such a mixture upstream of a catalyst filter zone, passing said solution to said catalyst filtering zone, withdrawing a filtrate that comprises said solution from said filter zone, flowing at least a portion of the filtrate so withdrawn between the plates of a capacitor while applying an alternating current to said plates and thereby producing a first signal that is representative of the concentration of the above-described polymer in the filtrate; converting said first signal into a control signal; transmitting said control signal to, and applying it to, a means for adding solvent to a mixture upstream of said catalyst filter zone; and, in response to said control signal, adjusting the means for adding to change the amount of solvent passed therethrough in direct proportion to the ratio of the concentration of the polymer as determined by said flowing while applying step to a preselected concentration of polymer.

3. The process of claim 2 comprising the additional steps of compensating said first signal for variations of the filtrate temperature from a predetermined temperature while performing said flowing while applying step; and maintaining the temperature of the mixture and the filtrate within the range extending from 150° F. to 450° F.

4. A process for controlling the filtering of a mixture of a solution and catalyst where the solution comprises (1) the polymeric form of an olefin that has been polymerized by contacting the olefin with a catalyst comprising chromium oxide and at least one material selected from the group consisting of silica, alumina, zirconia, and thoria, at least part of the chromium being in the hexavalent state, and (2) a solvent for the polymer, and wherein at least a part of the solvent is added to such a mixture upstream of a catalyst filter zone, comprising the steps of: withdrawing a filtrate that comprises said solution from said filter zone, flowing at least a portion of the filtrate so withdrawn between the plates of a capacitor while applying an alternating current to said plates and thereby producing a first signal that is representative of the concentration of the above-described polymer in the filtrate; converting said first signal into a control signal; transmitting said control signal to, and applying it to, a means for adding solvent to a mixture upstream of said filter zone; and, in response to said control signal, adjusting the means for adding to change the amount of solvent passed therethrough in proportion to the polymeric content of the filtrate as determined by said step of applying while flowing.

References Cited in the file of this patent

UNITED STATES PATENTS

| | | |
|---|---|---|
| 2,726,231 | Field et al. | Dec. 6, 1955 |
| 2,737,469 | Anderson et al. | Mar. 6, 1956 |
| 2,827,445 | Bartolomeo | Mar. 18, 1958 |
| 2,827,446 | Breslow | Mar. 18, 1958 |
| 2,894,824 | Lanning | July 14, 1959 |
| 2,904,751 | Parsons | Sept. 15, 1959 |